J. F. SCHOTT.
CHAIN.
APPLICATION FILED OCT. 17, 1919.
1,422,790.
Patented July 11, 1922.
2 SHEETS—SHEET 1.
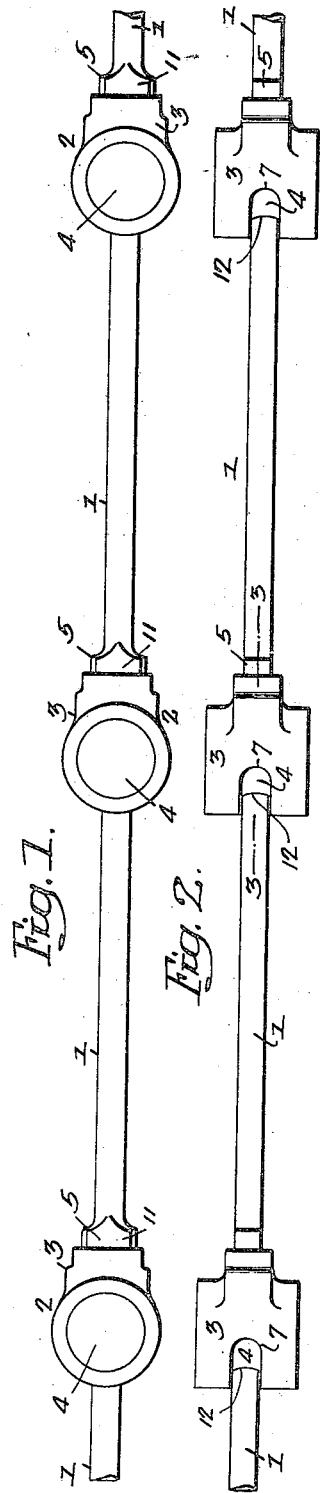
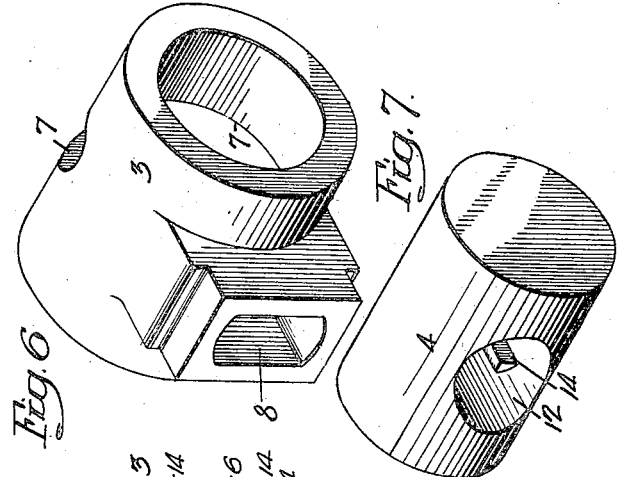
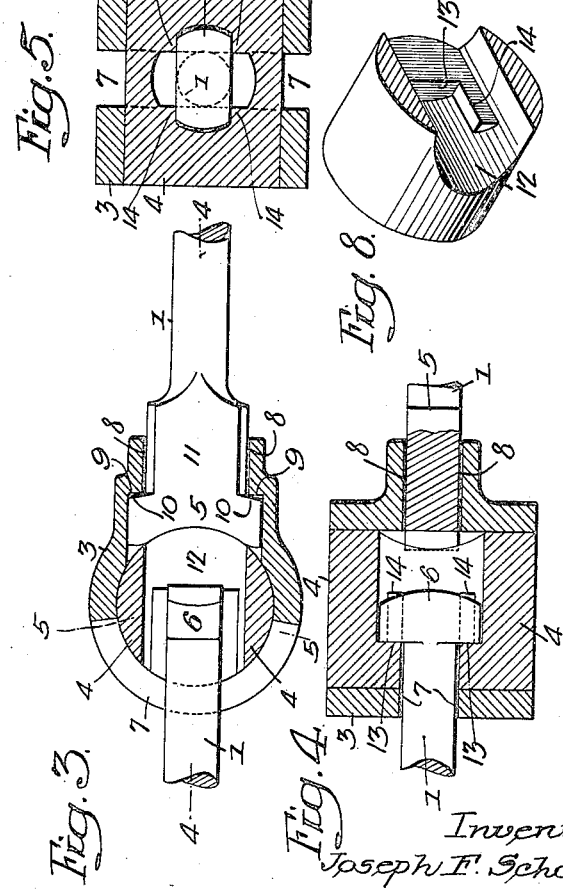
Inventor
Joseph F. Schott,
by his Attorneys

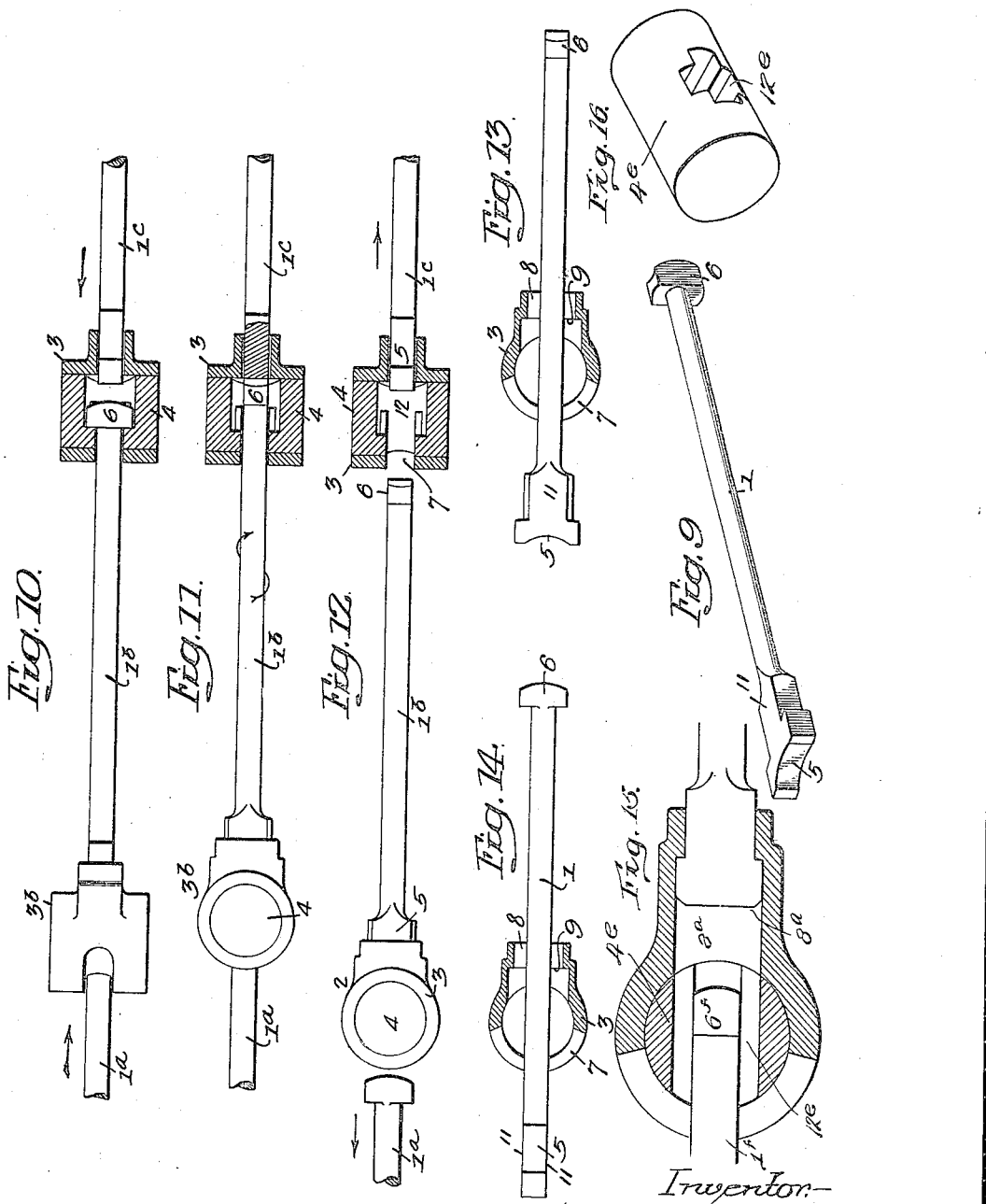

UNITED STATES PATENT OFFICE.

JOSEPH FULLMER SCHOTT, OF PHILADELPHIA, PENNSYLVANIA, ASSIGNOR TO LINK-BELT COMPANY, OF CHICAGO, ILLINOIS, A CORPORATION OF ILLINOIS.

CHAIN.

1,422,790.  Specification of Letters Patent.  Patented July 11, 1922.

Application filed October 17, 1919. Serial No. 331,301.

*To all whom it may concern:*

Be it known that I, JOSEPH FULLMER SCHOTT, a citizen of the United States, residing in Philadelphia, Pennsylvania, have invented certain Improvements in Chains, of which the following is a specification.

My invention relates to certain improvements in a type of chain in which a series of single bars is connected by block and socket points, so that they will articulate in one direction only in order to pass around sprocket wheels or over troughs of irregular shape when used as the chain of a flight conveyer.

The object of my invention is to construct a chain of this type so that the bars can be coupled and uncoupled with a comparatively slight longitudinal movement and without moving one bar at an angle in respect to another.

The invention also relates to details which will be fully described hereinafter, reference being had to the accompanying drawings, in which:—

Fig. 1, is a side view of a section of my improved chain;

Fig. 2, is a plan view of the same;

Fig. 3, is a longitudinal sectional view drawn to an enlarged scale on the line 3—3, Fig. 2;

Fig. 4, is a sectional view on the line 4—4, Fig. 3;

Fig. 5, is a sectional view on the line 5—5, Fig. 3;

Fig. 6, is a detached perspective view of the socket;

Fig. 7, is a detached perspective view of the block;

Fig. 8, is a sectional perspective view of the block showing the shoulders;

Fig. 9, is a perspective view of one of the bars;

Figs. 10, 11 and 12, are diagram views illustrating the method of detaching the bar from a block;

Figs. 13 and 14, are diagrams illustrating the method of detaching the bar from a socket;

Fig. 15, is a longitudinal sectional view illustrating a modification; and

Fig. 16, is a detached perspective view of the block of the modification in Fig. 15.

Referring to the drawings, 1 is a series of rods connected together by swivel blocks and socket members 2. 3 is a socket member and 4 is a block; the block being cylindrical and adapted to a cylindrical opening in the socket. The rods 1 are made as clearly shown in Fig. 9, having a large cross head 5 at one end and a small cross head 6 at the opposite end. In the present instance, the cross head 6 is at right angles to the cross head 5. The cross head 5 is adapted to the socket member 3, while the cross head 6 is adapted to the block 4.

Referring to Figs. 3, 4 and 5, the socket member has a segmental slot 7 to allow the rod 1, which passes through the slot and into the block, freedom of motion in order to pass around sprocket wheels. The socket member 3 has a rectangular opening 8 in which is a shoulder 9 to receive the shoulder 10 of the head 5. The portion 11 of the rod directly back of the shoulder is shaped to fit the recess 8. By this construction the rod 1 is held by its head 5 from turning in the recess in the socket 3 and, when the block 4 is in place, said block holds the rod against longitudinal movement, but when the block is moved then the rod can be moved back, as in Fig. 13, the width of the head 5 being less than the width of the slot 7.

On turning the rod, as in Fig. 14, the head 6 at the opposite end of the rod will pass freely through the opening 8 in the socket. The head 6 of the rod 1 is adapted to an opening 12 in the block 4; one end of this opening is cylindrical, as shown in Figs. 7 and 8, and is reduced at the opposite end, as shown in said figures, forming shoulders 13 and 14. The head 6 rests against the shoulder 13 and the width of the head is equal to the distance between the shoulders 14, so that when the head is in position, as in Figs. 3, 4 and 5, it is prevented from turning in the block 4 so that, when the two rods are connected as shown in Figs. 1 and 2, the rods are held in the socket and in the block and the block is free to turn in one direction in the socket.

Heretofore, it has been difficult to assemble a chain known as a "single bar chain" without first removing it from the sprocket wheel and bending the section of the chain at such an angle that the bar can be removed from the socket or the block.

In order to detach a section of the chain, all that is necessary is to move the bars 1ª and 1ᶜ towards each other, shown in diagram, Fig. 10. This movement causes the heads 6 of the bars 1ª and 1ᵇ to move into the cylindrical portions of the openings 12 so that the bar 1ᵇ and its socket 3ᵇ are free to turn on the bar 1ª and the head 6 of the bar 1ᵇ will be turned at right angles, as shown in Fig. 11, allowing it to be drawn out, as in Fig. 12, through the opening in the block and the slot 7 in the socket 3.

It will be noticed that the chain can be readily coupled with a slight longitudinal movement of the bars, yet when the chain is coupled and in position it will be impossible for the parts to be accidentally uncoupled, as both heads are firmly held in their respective cavities.

In order to give the head 5 sufficient strength, I increase its width directly back of the shoulder 10, and in order to allow for the block 4 to turn freely in the socket, the head 5 has a curved recess at the back, as clearly shown in Fig. 3, which forms a part of the inner wall of the socket. The rear end of each head 6 is rounded, as shown in Fig. 4, so that when it is turned at right angles it will conform to the rear wall of the socket, as it is desirable to design the coupling so that only a limited longitudinal movement is necessary to detach the parts.

While I have shown the heads of the bars at right angles to each other they may, in some instances, be on the same plane or at any angle desired.

In Figs. 15 and 16, I have illustrated a modification in which the head 6ᶠ of the bar 1ᶠ is located in a shouldered opening 12ᵉ in the block 4ᵉ, the opening being cruciform, as shown in Fig. 16. When the bar is in the position shown in Fig. 15 the head rests against the shoulders, but when the bar is pushed back so that its head is in the cylindrical cavity 8ª in the socket and then turned a quarter turn it can be withdrawn, as the head will pass freely through the opening 12ᵉ.

By the above construction, it will be seen that I am enabled to provide a chain consisting of a series of single bars and couplings, so that the bars can be readily coupled by comparatively limited longitudinal movement and without the necessity of bending the chain. When the chain is properly assembled and when in action, there is no liability of one section becoming detached from another. Furthermore, by this construction the two heads can be made integral with the bar, making a very substantial chain and one in which there are no loose parts.

I claim:—

1. The combination in a single bar chain, of a series of bars, each bar having a large head at one end and a small head at the opposite end, the heads being integral with the bars; and block and socket couplings connecting the bars, each block having a recess for the small head of a bar and each socket having a recess for the large head of a bar, one of said parts having a space between the two recesses to allow for the longitudinal movement of the bar and to allow a head to turn in the recess when it is desired to detach a bar.

2. The combination in a single bar chain, of a series of bars; couplings connected to the bars, each bar having an integral head at each end, the coupling being made in two parts, one in the form of a socket and the other in the form of a cylindrical block, the socket having a shouldered recess adapted to receive the head at one end of a bar, the block having a shouldered recess adapted to receive the head at the other end of an adjoining bar, the block having a space back of the recess to allow for the longitudinal movement of the bar and to allow the head to turn in the recess when it is desired to detach the bar.

3. The combination in a single bar chain, of a series of bars, each bar having an integral head at each end; one head being larger than the other; a series of couplings connecting the bars, each coupling consisting of a socket and a block swiveled in the socket, the socket having a slot and the block having a shouldered cavity, one end of the bar extending through the slot and into the cavity of the block, the head of the bar engaging the shoulder in the block, the socket having an extension opposite to the slot and having a shouldered cavity to receive the head at the opposite end of another bar.

4. The combination in a single bar chain, of a series of bars and a series of couplings connecting the bars, each bar having a head at each end, one head being at right angles to the other head, each coupling consisting of a socket having a transverse, cylindrical opening therein; and a cylindrical block mounted in the opening, the socket being slotted for the passage of one of the bars, the socket having a shouldered recess opposite the slot adapted to receive one of the heads of a bar, the block having a shouldered recess adapted to receive the other head of an adjoining bar, the shoulder of the socket being at right angles to the shoulder of the block.

5. The combination in a single bar chain, of a series of bars having integral heads at each end, the head at one end of each bar being at right angles to the head at the opposite end, one head being wider than the other head; a series of couplings connecting the bars, each coupling consisting of a socket; and a cylindrical block adapted to the socket, the socket being slotted for the passage of the bar coupled to the socket, the slot also allowing the free movement of the bar coupled to the block, the block having an opening therein provided with shoulders at each side to engage the small head of the bar, the socket having an extension provided with integral shoulders to engage the large head of an adjoining bar, the end of the large head of the bar being shaped to conform to the inner wall of the socket to allow the block to turn freely in the socket.

JOSEPH FULLMER SCHOTT.